US008965969B2

(12) United States Patent
Hautakorpi et al.

(10) Patent No.: US 8,965,969 B2
(45) Date of Patent: Feb. 24, 2015

(54) IP ADDRESS DISCOVERY

(75) Inventors: Jani Hautakorpi, Masala (FI); Arturo Salinas, Espoo (FI)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 500 days.

(21) Appl. No.: 13/063,970

(22) PCT Filed: Jan. 8, 2009

(86) PCT No.: PCT/EP2009/050189
§ 371 (c)(1),
(2), (4) Date: Jun. 6, 2011

(87) PCT Pub. No.: WO2010/031597
PCT Pub. Date: Mar. 25, 2010

(65) Prior Publication Data
US 2011/0231491 A1    Sep. 22, 2011

Related U.S. Application Data

(60) Provisional application No. 61/097,562, filed on Sep. 17, 2008.

(51) Int. Cl.
*G06F 15/16*      (2006.01)
*H04L 29/08*     (2006.01)
(Continued)

(52) U.S. Cl.
CPC ...... *H04L 29/12594* (2013.01); *H04L 67/1091* (2013.01); *H04L 61/3085* (2013.01); *H04L 65/104* (2013.01); *H04L 61/1529* (2013.01); *H04L 67/104* (2013.01); *H04L 29/12094* (2013.01); *H04L 65/1006* (2013.01)
USPC ........................................................ 709/204

(58) Field of Classification Search
USPC ........................................................ 709/204
See application file for complete search history.

(56) References Cited

U.S. PATENT DOCUMENTS 8,254,553 B2 *   8/2012   Agarwal et al. .......... 379/221.13
8,411,670 B2 *   4/2013   Ganesan et al. .............. 370/352

FOREIGN PATENT DOCUMENTS

JP        2003-067276 A        3/2003

OTHER PUBLICATIONS

Using an External DHT as a SIP Location Service: Published by Kundan Singh and Henning Schulzrinne—Feb. 22, 2006.*

(Continued)

*Primary Examiner* — Kevin Bates
*Assistant Examiner* — Ronak Patel
(74) *Attorney, Agent, or Firm* — Leffler Intellectual Property Law, PLLC

(57) ABSTRACT

A method and apparatus each facilitate communication between users of a SIP-based network and SIP users external to that network. Each user of the SIP-based network possesses a SIP URI comprising a host name part belonging to the network and a user name part. The external users have access to a peer-to-peer network to resolve SIP URIs into contact IP addresses. The method comprises publishing into said peer-to-peer network a mapping between an identifier of a gateway to said SIP-based network and an IP address of the gateway. The identifier corresponds to or is derivable from said host name part. Upon receipt of a query at the gateway in respect of a URI associated with one of said users of said SIP-based network, the URI is resolved into a contact IP address. The contact IP address is returned to a node from which the query originated.

9 Claims, 5 Drawing Sheets

(51) Int. Cl.
*H04L 29/12* (2006.01)
*H04L 29/06* (2006.01)

(56) References Cited

OTHER PUBLICATIONS

P2PNS: A Secure Distributed Name Service for P2PSIP: Published by Ingmar Baumgart—Jan. 14, 2008.*
Interworking between P2PSIP Overlays and IMS Networks—Published by Enrico Marocco, Antonio Manzalini, Marcello Sampò and Gianni Canal: From Telecom Italia Lab—Oct. 25, 2007.*
PCT International Search Report, dated Apr. 28, 2009, in connection with International Application No. PCT/EP2009/050189.
PCT Written Opinion, dated Apr. 28, 2009, in connection with International Application No. PCT/EP2009/050189.
International Preliminary Report on Patentability, dated Dec. 9, 2010, in connection with International Application No. PCT/EP2009/050189.
Singh, Kundan Narendra "Reliable, Scalable and Interoperable Internet Telephony" 2006, XP002524139. Retrieved from the Internet: URL:http://www1.cs.columbia.edu/{kns10/publication/thesis.pdf, pp. 146-151.
Juwei Shi et al. "A Hierarchical Peer-to-Peer SIP System for Heterogeneous Overlays Interworking" Global Telecommunications Conference, 2007, Globecom 2007. IEEE, Piscataway, NJ, USA, Nov. 1, 2007, pp. 93-97, XP031195953, ISBN: 978-1-4244-1042-2.
Shi et al. "A Hierarchical P2P-SIP Architecture; draft-shi-p2psip-heir-arch-00.txt" IEFT Standard-Working-Draft, Internet Engineering Task Force, IEFT, CH, Aug. 22, 2006, XP015047261, ISSN: 0000-0004.
Hautakorpi, J. et al. "Interconnecting P2PSIP and IMS" Next Generation Mobile Applications, Services and Technologies, 2008. NGMAST '08. The Second International Conference On, IEEE, Piscataway, NJ, USA, Sep. 16, 2008, pp. 83-88, XP031409658, ISBN: 978-0-7695-3333-9.
Ratnasamy, S. et al. "A Scalable Content-Addressable Network" Proceedings of ACM SIGCOMM 2001 Conference, Aug. 27-31, 2001, San Diego, California, USA, ACM, 1-58113-411-08/01/0008.
Stoica, I. et al. "CHORD: A Scalable Peer-to-Peer Lookup Service for Internet Applications" Proceedings of the ACM SIGCOMM 2001 Conference, Aug. 27-31, 2001, San Diego, California, USA, ACM, 1-58113-411-08/01/0008.
Rosenberg, J. et al. "SIP: Session Initiation Protocol" RFC 3261, Internet Engineering Task Force, Network Working Group, The Internet Society, Jun. 2002.
Bryan, D. et al. "Concepts and Terminology for Peer-to-Peer SIP", IETF Trust, Nov. 2007. draft-ietf-p2psip-concepts-01 (http://tools.ietf.org/id/draft-ietf-p2psip-concepts-01.txt).
Marocco, E. et al. "Interworking between P2PSIP Overlays and Conventional SIP Networks", draft-marocco-p2psip-interwork-01, Internet Engineering Task Force, Network Working Group, Mar. 2007.
Jennings, C. et al. REsource, LOcation and Discovery (RELOAD), draft-ietf-p2psip-reload-00, IETF Trust, Network Working Group, Jul. 2008, (http://tools.ietf.org/id/draft-ietf-p2psip-reload-00.txt).
Japanese Office Action, dated Mar. 29, 2013, in connection with counterpart Japanese Patent Application No. 2011-526424, all pages (see translation below).
Translation of Japanese Office Action, dated Mar. 29, 2013, in connection with counterpart Japanese Patent Application No. 2011-526424, all pages.
Hautakorpi, J. et al "Interconnecting P2PSIP and IMS" The Second International Conference on Next Generation Mobile Applications, Sep. 16, 2008, IEEE, pp. 83-88.
EP Article 94(3) Communication, dated Apr. 7, 2014, in connection with European Patent Application No. 09 778 925.9-1853.
Singh, Kundan Narendra "Reliable, Scalable and Interoperable Internet Telephony" Columbia University Thesis, 2006, XP002524139, retrieved from the Internet: URL:httpe://www1.cs.columbia.edu/~kns10/publication/thesis.pdf.
Hautakorpi, J. et al. "Interconnecting P2PSIP and IMS" The Second International Conference on Next Generation Mobile Applications, Services and Technologies, 2008, IEEE, Piscataway, NJ, USA, Sep. 16, 2008, pp. 83-88, XP031409658, ISBN: 978-0-7685-3333-9.

* cited by examiner

IP ADDRESS DISCOVERY

CROSS-REFERENCE TO RELATED APPLICATIONS

This application claims the benefit of U.S. Provisional Application No. 61/097,562, filed Sep. 17, 2008, which is hereby incorporated herein by reference in its entirety.

TECHNICAL FIELD

The present invention relates to a method of facilitating communication between users of a private Session Initiation Protocol (SIP) network and external SIP users, as well as apparatus configured to provide a SIP User Agent for contacting a peer SIP User Agent, a gateway for interconnecting users of a private SIP-based network to a peer-to-peer SIP-based network, and a node of a peer-to-peer SIP-based network.

BACKGROUND

Distributed computing requires constant interaction between all collaborating network nodes within a distributed data structure. It is impossible to provide such constant interaction between network nodes using a traditional client-server based approach as a server would form both a bottleneck and a single point of failure. For this reason the so-called peer-to-peer (P2P) network has been proposed in which all network nodes take an equal role. In a P2P network all network nodes are equal in the sense that they incorporate both client and server functionalities and each node makes requests directly to other nodes within the network.

In a collaborative network environment a common data repository is required, and this data repository can also be implemented by P2P means. Distributed hash tables (DHTs) are used for this data repository utilising a hash function to map data keys onto coordinate spaces and to distribute coordinate spaces among the participating nodes. A routing algorithm is responsible for finding the node responsible for a given segment of space and thus finding a queried key. Some DHT applications use so-called consistent hashing in which the same hash function is used to map keys and node identifiers to the same coordinate space, and a distance metric is used to map space partitions to nodes. In such applications participating nodes are identified by unique identifiers, but are addressed by means of their network addresses. Therefore each node in the network requires a triplet of data (unique identifier, IP address, port number) in order to be able to communicate with other participating nodes.

One such DHT implemented data structure is the so-called Chord ring structure, as disclosed by I. Stoica, R. Morris, D. Karger, F. Kaashoek and H. Balakrishnan, "Chord: A scalable peer-to-peer lookup service for internet applications", Proceedings of SIGCOMM'01, 2001. In a Chord ring structure, the identifier space used is a circle, the highest and lowest identifiers represent neighbouring nodes, and the identifiers are organized in clockwise order from lowest to highest. Furthermore, in such a Chord ring structure, the two direct neighbours of a particular node are denoted the "predecessor" and "successor" of that node, the former being the counter-clockwise neighbour, and the latter being the clockwise neighbour, i.e., for all nodes except the node with the lowest identifier, the predecessor of the node is the node with the highest identifier amongst the nodes having lower identifiers than the node in question, whereas, for the node with the lowest identifier, the predecessor of the node is the node with the highest identifier amongst all the nodes. The successor of the node in question is determined similarly but with the ordering of the nodes in the opposite direction.

Additionally, in such a Chord ring structure, every node participating in the network becomes responsible for the identifier space interval between its own identifier (inclusive) and the identifier of its predecessor (exclusive). All node insertions and requests for items of data with keys in this interval are to be forwarded to the address of this specific node.

Much of the research in this area has been focused either on enhancing the DHT algorithms or on developing file sharing applications (e.g. BitTorrent and eMule). Until recently, little effort has been focused on utilizing P2P technologies for interpersonal communication, e.g. voice and multimedia telephony. However, there is an ongoing effort to standardise protocols that would enable such interpersonal communication in P2P networks. These standardization efforts are taking place in the P2PSIP (Peer-to-Peer Session Initiation Protocol) working group of the Internet Engineering Task Force (IETF). Products of the working group to date include:

1) D. Bryan, P. Matthews, E. Shim, D. Willis, Concepts and Terminology for Peer to Peer SIP, November 2007, draft-ietf-p2psip-concepts-01 (http://tools.ietf.org/id/draft-ietf-p2psip-concepts-01.txt), and
2) E. Marocco, D. Bryan, Interworking between P2PSIP Overlays and Conventional SIP Networks, March 2007, draft-marocco-p2psip-interwork-01 (http://tools.ietf.org/id/draft-marocco-p2psip-interwork-01.txt).

Although it would be possible to build isolated P2PSIP networks within which users can locate and connect to peer users, it is expected that at least some networks will be connected via gateways to existing SIP-based networks, in order to allow users within a given P2PSIP to communicate with users in other P2PSIP networks and within IMS networks and traditional client/server networks.

A solution for enabling interconnection of P2P networks is presented by Marocco and Bryan (supra). It enables interconnection by using proxies which are registered to the Domain Name System (DNS). For a given P2PSIP network, queries addressed to an external URI are forwarded to a local proxy. The proxy then queries the DNS to determine an IP address of the proxy responsible for the external URI. This IP address is returned to the originating user within the P2PSIP network so that the user can forward, for example, a SIP INVITE to the remote proxy. The remote proxy forwards the initiation request to the remote user. However, a potential problem with this solution is that it requires each proxy to have a valid DNS domain name. This is not suitable for dynamic (for instance where the IP address of the proxy changes often) or ad-hoc (for instance large scale conference or sporting events) environments.

SUMMARY

It is an object of the present invention to enable the interconnection of SIP-based networks, at least one of which comprises a P2PSIP network. This is achieved by providing a gateway that is able to register into the P2PSIP network, an identifier and gateway IP address, where the identifier corresponds to or is derivable from a host name part.

According to a first aspect of the present invention there is provided a method of facilitating communication between users of a SIP-based network and SIP users external to that network. Each user of the SIP-based network possesses a SIP URI comprising a host name part belonging to the network and a user name part. The external users have access to a peer-to-peer network to resolve SIP URIs into contact IP addresses. The method comprises publishing into said peer-to-peer network a mapping between an identifier of a gateway to said SIP-based network and an IP address of the gateway. The identifier corresponds to or is derivable from said host name part. Upon receipt of a query at the gateway in respect of a URI associated with one of said users of said SIP-based network, the URI is resolved into a contact IP address. The contact IP address is returned to a node from which the query originated. The step of resolving the URI into a contact address may comprise performing a look-up in a peer-to-peer network of said SIP-based network.

It will be understood that the SIP-based network may be any suitable SIP network, for example an IP Multimedia Subsystem network or a client-server SIP-based network.

The query may be received from an external SIP user. Alternatively, the query may be received from a further gateway. In the latter case, the query is sent on behalf of a SIP user behind that further gateway.

In some embodiments, the SIP-based network may comprise a further peer-to-peer network. In these embodiments, users of the first mentioned peer-to-peer network each possess a SIP URI comprising a second host name part. The method according to these embodiments comprises publishing into said further peer-to-peer network a mapping between an identifier of said gateway and an IP address of the gateway. This identifier corresponds to or is derivable from said second host name part. Upon receipt of a query at the gateway in respect of a URI associated with one of said users of the first mentioned peer-to-peer network, said URI is resolved into a contact IP address. This contact IP address is returned to a node from which the query originated.

The step of publishing a mapping into the or each peer-to-peer network may comprise registering the gateway to the peer-to-peer network(s).

The or each peer-to-peer network may be an overlay network. The overlay network may employ a Distributed Hash Table (DHT) based addressing mechanism, such that the overlay network is a Distributed Hash Table-based network. Where the or each peer-to-peer network is a Distributed Hash Table-based network, mappings are distributed across the network using values obtained by hashing SIP URIs and may be stored at one or more nodes of the or each peer-to-peer network.

In some embodiments, the query received at the gateway is be a P2PSIP (Peer-to-Peer SIP) get message.

SIP messages, addressed to said contact address and received at said gateway, may be forwarded to a destination SIP user within said SIP-based network. It will be appreciated that these SIP messages are forwarded after the contact IP address has been returned to the node from which the query originated.

According to a second aspect of the present invention there is provided apparatus configured to provide a SIP user agent. The apparatus comprises a registration unit, a SIP session initiator, a detector and an IP address resolution unit. The registration unit is for registering the SIP user agent with a local peer-to-peer SIP-based network, whilst the SIP session initiator is for initiating a SIP session with a peer SIP user agent. The detector is for detecting, from a SIP URI of said peer user agent, if the peer user agent belongs to an external domain. The IP address resolution unit is configured, in the event that said peer user agent does belong to an external domain, to query said local peer-to-peer network using a host part of said SIP URI to obtain an IP address of a gateway interconnecting said local peer-to-peer network and said external domain. The IP address resolution unit is also configured to query said gateway using said IP address to obtain a contact IP address for said peer user agent. The SIP session initiator is further arranged to send a session initiation message to said peer user agent using the received contact IP address. The local peer-to-peer SIP-based network may a Distributed Hash Table-based network.

According to a third aspect of the present invention there is provided gateway apparatus for facilitating communication between users of a SIP-based network and SIP users external to that network. Each user of the SIP-based network possesses a SIP URI comprising a host name part belonging to the network and a user name part. The external users have access to a peer-to-peer network to resolve SIP URIs into contact IP addresses. The apparatus comprises a publishing unit and an IP address resolution unit. The publishing unit is for publishing, into said peer-to-peer network, a mapping between an identifier and an IP address of the gateway apparatus. The identifier corresponds to or is derivable from said host name part. The IP address resolution unit is arranged, upon receipt of a query at the gateway in respect of a URI associated with one of said users of said SIP-based network, to resolve that URI into a contact IP address. The IP address resolution unit is further arranged to return the contact IP address to a node from which the query originated.

The IP address resolution unit may be arranged to resolve said URI into a contact IP address by performing a query within a peer-to-peer network of said SIP-based network.

According to a fourth aspect of the present invention there is provided a method of facilitating communication between users of a private SIP-based network and SIP users external to that network. Each user of the private SIP-based network possesses a SIP URI comprising a host name part belonging to the network and a user name part. The external users have access to a peer-to-peer network to resolve SIP URIs into contact IP addresses. The method comprises publishing, in said peer-to-peer SIP-based network, an association between an IP address of a gateway of the private SIP-based network and said host name part. A peer-to-peer session is initiated at one of said external SIP users. A first lookup request is sent to said peer-to-peer SIP-based network in respect of said host name part. In response, the IP address of said gateway is returned to an external SIP user. A further lookup request is sent to said gateway using the provided IP address. The lookup request contains the SIP URI of an internal user of said private SIP-based network or a derivative of that Session Initiation Protocol Uniform Resource Identifier. An IP address of said internal user is returned to the external user. The peer-to-peer network may be a Distributed Hash Table-based network.

DETAILED DESCRIPTION

A P2PSIP network will maintain contact addresses for members that are registered with it. In the case of a DHT based network, this means that, for each member, the network maintains a mapping between a Universal Resource Identifier (URI) and an IP address. Mapping information is distributed across the nodes of the overlay network by applying hashing to the URIs. By way of example, consider a P2PSIP network implemented within a corporate LAN. The LAN is associated with a host name, e.g. "example.com", such that users of the LAN each possess a URI of the form "user.name@example.com". Of course, users within other domains, i.e. users external to the corporate LAN, will not be members of this P2PSIP network and the network will have no knowledge of their IP addresses.

A mechanism for connecting URI-based networks in a P2P Environment (referred to herein as "URIConn") is described here. This mechanism is suitable for static, dynamic, and ad-hoc environments. An advantage of the operation of this mechanism is that it does not depend on the use of the Domain Name System (DNS).

Figure 1:
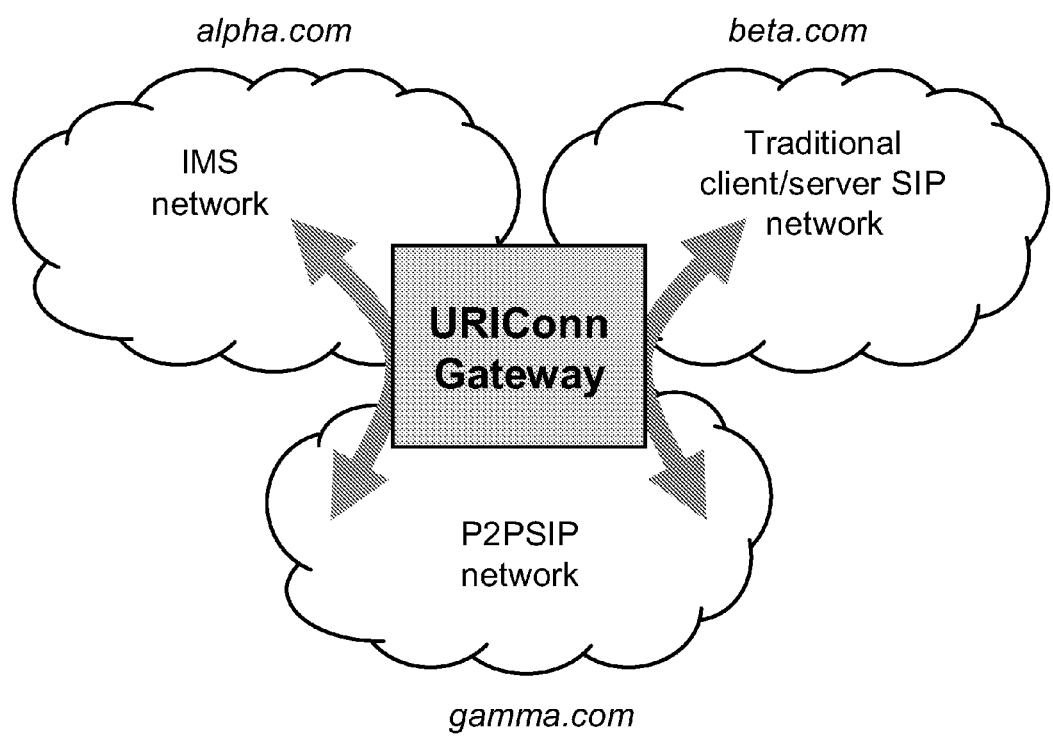
FIG. 1 illustrates schematically a gateway which enables interconnection between an IMS network, a client-server SIP-based network, and a P2PSIP network.

FIG. 1 presents a high-level scenario where a gateway, referred to as an URIConn gateway, enables interconnection between an IMS network, a traditional client-server SIP-based network, and a P2PSIP network. It is noteworthy that the URIConn mechanism is not limited to the aforementioned networks. Indeed, it can be used with any network that uses URIs for addressing users, including, in some embodiments, e-mail. By way of example, a scenario involving the interconnection of two P2PSIP networks, will be considered. A first of the networks is associated with the host name "alpha.com" whilst the second is associated with the host name "beta.com".

Figure 2:
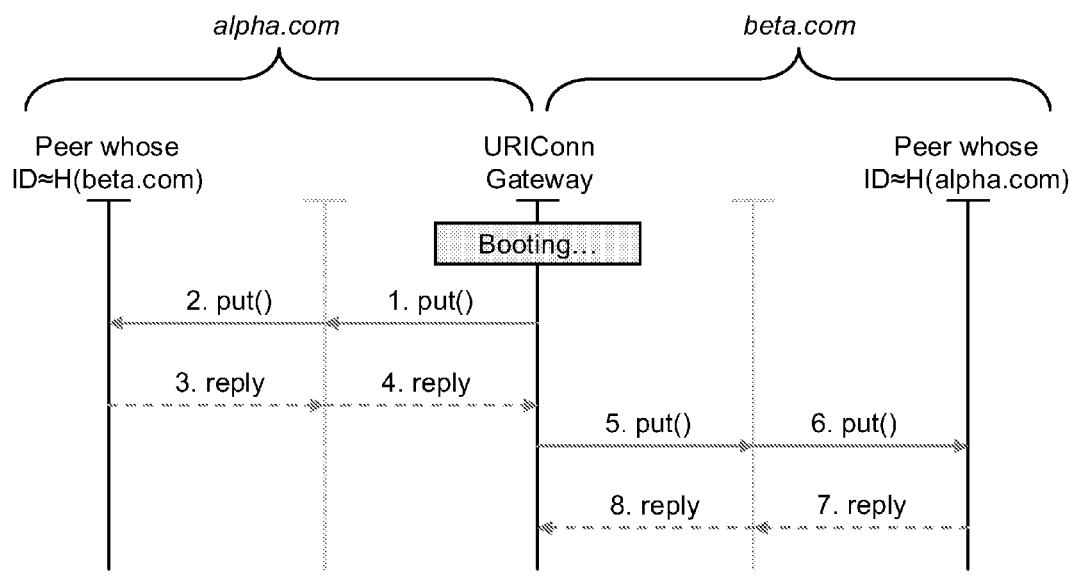
FIG. 2 is a signaling flow showing the registration procedure of a gateway.

A preliminary step for enabling interconnection is that a URIConn gateway registers itself to both P2PSIP networks. Following registration, the gateway can assist in session establishments. A signaling flow showing the registration procedures of a URIConn gateway is illustrated in FIG. 2. These procedures make use of the "put" message which can be implemented, for example, as a "Store" message proposed for P2PSIP in C. Jennings, B. Lowekamp, E. Rescorla, S. Baset, H. Schulzrinne, REsource LOcation And Discovery (RELOAD), July 2008, draft-ietf-p2psip-reload-00 (http://tools.ietf.org/id/draft-ietf-p2psip-reload-00.txt). Before the gateway can effect registration, it has to know the domain names of the networks it is connected to. This can be established, for example, by manual configuration.

The messages, and associated procedures, in FIG. 2 are as follows:
1. The gateway sends a put request to the alpha.com network. The put request contains a binding between the gateway's IP address and the beta.com domain name.
2. One or more intermediate nodes forward the put request to the overlay network node which is responsible for H(beta.com), where H denotes a hash function.
3. Reply to the request.
4. Forwarded reply.
This completes the registration of the URIConn gateway to the alpha.com network.
5. The Gateway then sends a put request to the beta.com network. The put request contains the binding between the gateway's IP address and the aplha.com domain name.
6. One or more intermediate nodes forward the put request to the node which is responsible for H(alpha.com).
7. Reply to the request.
8. Forwarded reply.
This completes the registration of the URIConn gateway to the beta.com network.

It will be appreciated that, where the URIConn gateway interconnects a P2PSIP network and an IMS network, the put request is not needed on the IMS side. Rather, the gateway may be manually registered on the IMS side by the administrator of the IMS network.

Figure 3:
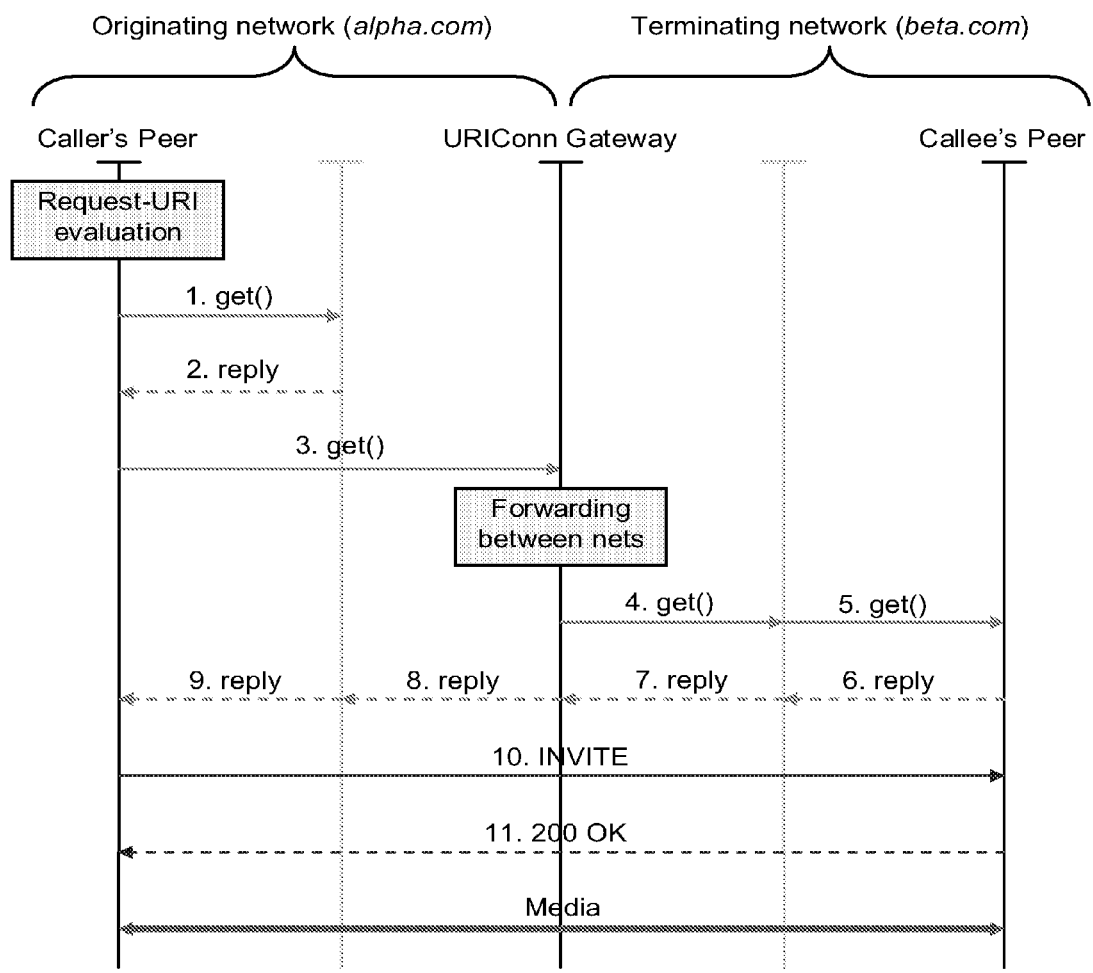
FIG. 3 is a signaling flow from the session establishment.

Following completion of the registration procedures (FIG. 2), a user within one of the networks connected to the URIConn gateway can initiate session establishment. An example session establishment procedure is illustrated by the signaling flow of FIG. 3. The messages, and associated procedures, in FIG. 3 are as follows:
1. Caller in alpha.com network initiates session establishment to john.doe@beta.com. The P2PSIP UA performs a Request-URI evaluation and determines that the callee is on a different network. The UA sends a get request requesting an IP address that is associated with beta.com. Note that just the domain part is used in the request. The request is received and responded to by the node within the local P2PSIP network that possess the mapping between H(beta.com) and the IP address of the URIConn gateway.
2. Reply to the request which contains the IP address of the URIConn gateway.
3. Caller's UA sends a get request to the IP address of the URIConn gateway and which requests an IP address associated with john.doe@beta.com. Note that both the username and domain parts are used in the request, as usual.
4. Gateway forwards the request to the beta.com network.
5. One or more intermediary nodes forward the get request to the node within the beta.com network which is responsible for H(john.doe@beta.com). The node responsible for H(john.doe@beta.com) can be either the callee's peer itself, or some other node in the beta.com network, depending on the network configuration.
6. Reply to the request which contains the IP address associated with john.doe@beta.com.
7. Forwarded reply.
8. Forwarded reply.
9. Forwarded reply.
10. Caller's UA send a SIP INVITE to the callee's UA.
11. Callee's UA replies with 200 OK.

The SIP INVITE can be routed using, for example, one of three different methods: 1) via the overlay network, 2) via a relay, and 3) directly. FIG. 3 illustrates the last method as this is the simplest case. However, method 1 or 2 may be required where Network Address Translators are present in the network.

If the gateway is used to interconnect, for example, an IMS network to the beta.com network, and the caller is on the IMS side, then messages 1 to 3 and 8 to 9 are not required. The caller's IMS User Agent (UA) can directly send the SIP INVITE and the IMS network will route this to the gateway.

Figure 4:
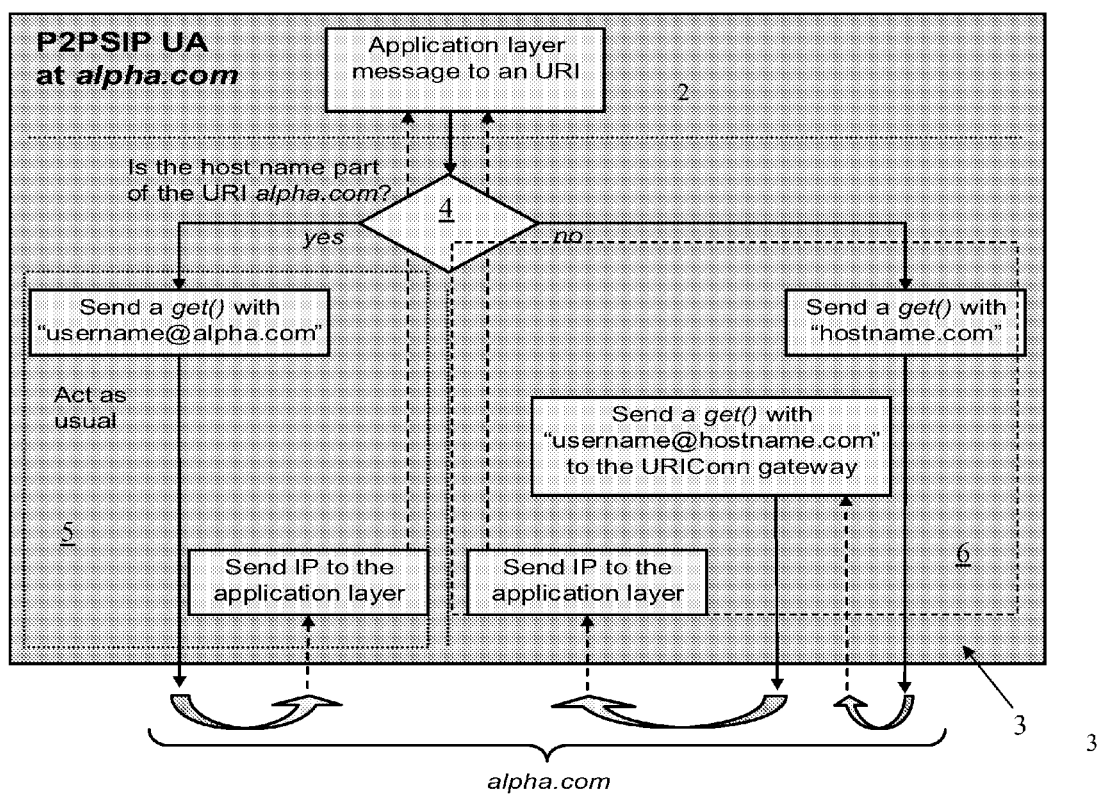
FIG. 4 illustrates schematically the procedures in a P2PSIP UA.

FIG. 4 illustrates various functional components of the P2PSIP UA 1. Firstly, the communication application 2, on the application layer, expresses a desire to send a message to a given URI. Thereafter, the P2P module 3 performs the Request-URI evaluation. A decision unit 4 within the P2P module determines whether or not the Request-URI belongs to the same network as the P2PSIP UA itself. If yes, then the usual P2PSIP UA procedures are applied by a local routing unit 5. In contrast, if the Request-URI belongs to some other network, then the following procedure is carried out by an external routing unit 6.

Firstly, a get request with just a hostname part is sent. The reply to that request contains the IP address of the gateway. After that, another get request, this time with both username and hostname parts, is sent directly to the gateway. The gateway then replies with the IP address associated with a given URI. Thereafter, the application layer message can be sent to that IP address.

Figure 5:
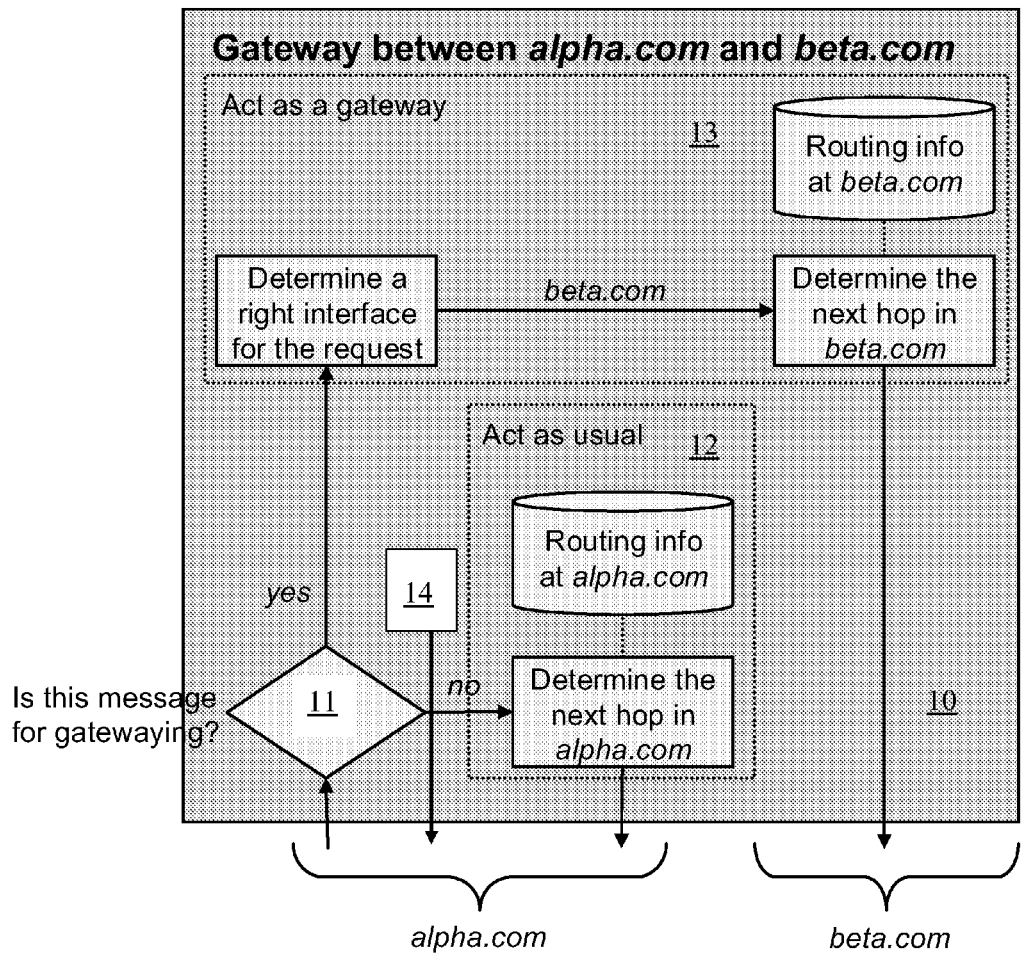
FIG. 5 illustrates schematically the procedures in a gateway.

The procedure implemented within the URIConn gateway is illustrated in FIG. 5, together with functional components of the gateway. The gateway can act either as a usual P2PSIP UA when forwarding messages, or as a gateway. The gateway decides which mode it should act in by performing the same kind of Request-URI evaluation as preformed by the P2PSIP UA, i.e. by determining if the host name part of the destination URI belongs to the local network. When acting in a gateway mode, it first determines which is the appropriate physical interface to forward the request on. After that, the gateway looks up the best candidate for a next hop node from its routing information database. The routing information database can be different for each network (for P2PSIP it is an overlay routing table). Finally, the gateway forwards the message to the next hop node.

FIG. 5 illustrates the case where a message received by the gateway 10 is coming from the alpha.com network. A decision unit 11 within the gateway first determines if the host name of the destination URI is a local host name. If so, the message is passed to a local routing unit 12 and forwarded to the next hop node in the alpha.com network. If not, the message is passed to a gateway handling unit 13 which determines the next hop node in the beta.com network, and forwards the message on that network. The gateway also comprises a registration unit 14 configured to publish, within the P2P network of alpha.com, a mapping between its IP address and the beta.com host part.

In some embodiments, the gateway may work "symmetrically", providing the forwarding functionality of FIG. 5 to networks on two (or more) sides. It is also noted that if the gateway is used with an IMS network, then the IMS terminals (UAs) do not require modification. Together, the IMS network and the URIConn gateway make the internetwork behaviour transparent to the IMS UAs.

The potential advantages of the interconnection procedures described above can be summarised as follows:
- The method is suitable for dynamic and ad-hoc environments;
- The method has low overheads (for instance, the method does not induce excessive amounts of signaling);
- The method can, in some scenarios at least, be used with existing end-user terminals, such as IMS terminals;
- The method does not depend on the use of a DNS;
- The method can be used with any network that uses URIs for addressing users.

The references cited herein are hereby incorporated in their entirety to the extent that they do not conflict with the present application.

It will be appreciated by the person of skill in the art that various modifications may be made to the above-described embodiments without departing from the scope of the present invention. For example, private SIP-based networks (P2PSIP, IMS, client server, etc) may be coupled to a shared P2PSIP network via respective URIConn gateways. In this scenario, each gateway registers separately with the shared P2PSIP network. Rather than determining a gateway IP address (for a remote, peer SIP user) by directly accessing the shared P2PSIP network, a user does this via its own URIConn gateway.

The invention claimed is:

1. A method of facilitating communication between users of a SIP-based network comprising a first peer-to-peer network and SIP users external to the SIP-based network, where each user of the SIP-based network possesses a SIP URI comprising a first host name part belonging to the network and a user name part, and said external users have access to a second peer-to-peer network to resolve SIP URIs into contact IP addresses and each external user possesses a SIP URI comprising a second host name part, the method comprising:
   publishing into said second peer-to-peer network a mapping between an identifier of a gateway to said SIP-based network and an IP address of the gateway, said identifier corresponding to or being derivable from said first host name part;
   upon receipt of a first query at the gateway in respect of a URI associated with one of said users of said SIP-based network, resolving that URI into a contact IP address by performing a look-up in said first peer-to-peer network, and also in response to receipt of the first query at the gateway returning the contact IP address to a node from which the first query originated;
   publishing into said first peer-to-peer network a mapping between an identifier of said gateway and an IP address of the gateway, said identifier corresponding to or being derivable from said second host name part; and
   upon receipt of a second query at the gateway in respect of a URI associated with one of said users of said second peer-to-peer network, resolving that URI into a contact IP address by performing a look-up in said second peer-to-peer network, and returning the contact IP address to a node from which the second query originated.

2. A method according to claim 1, wherein said SIP-based network is an IP Multimedia Subsystem network or a client-server SIP-based network.

3. A method according to claim 1, wherein said first query is received from an external SIP user.

4. A method according to claim 1, wherein said first query is received from a further gateway and is sent on behalf of a SIP user behind that further gateway.

5. A method according to claim 1, wherein said step of publishing a mapping into the peer-to-peer network comprises registering the gateway to the peer-to-peer network.

6. A method according to claim 1, wherein the peer-to-peer network is a Distributed Hash Table based network, with mappings being distributed across the network using values obtained by hashing SIP URIs.

7. A method according to claim 1, wherein at least one of said first and second queries received at the gateway is a P2PSIP get message.

8. A method according to claim 1, the method comprising, subsequent to said step of returning the contact IP address in response to receipt of a query in respect of a URI associated with one of said users of said SIP-based network, forwarding SIP messages addressed to said contact address and received at said gateway, to a destination SIP user within said SIP-based network.

9. A gateway apparatus for facilitating communication between users of a SIP-based network comprising a first peer-to-peer network and SIP users external to that SIP-based network, where each user of the SIP-based network possesses a SIP URI comprising a first host name part belonging to the network and a user name part, and said external users have access to a second peer-to-peer network to resolve SIP URIs into contact IP addresses and each external user possesses a SIP URI comprising a second host name part, the apparatus comprising:
   a registration unit for publishing into said second peer-to-peer network a mapping between an identifier and an IP address of the gateway apparatus, said identifier corresponding to or being derivable from said first host name part, and for publishing into said first peer-to-peer network a mapping between an identifier of said gateway apparatus and an IP address of the gateway apparatus, said identifier corresponding to or being derivable from said second host name part; and an IP address resolution unit arranged, upon receipt of a first query at the gateway apparatus in respect of a URI associated with one of said users of said SIP-based network, to resolve that URI into a contact IP address by performing a look-up in said first peer-to-peer network, and also in response to receipt of the first query at the gateway to return the contact IP address to a node from which the first query originated, and upon receipt of a second query at the gateway apparatus in respect of a URI associated with one of said users of said second peer-to-peer network, to resolve that URI into a contact IP address by performing a look-up in said second peer-to-peer network, and to return the contact IP address to a node from which the second query originated.

\* \* \* \* \*